US012295422B2

(12) United States Patent
An et al.

(10) Patent No.: US 12,295,422 B2
(45) Date of Patent: May 13, 2025

(54) CLEANING KIT FOR AEROSOL GENERATING DEVICE

(71) Applicant: KT&G CORPORATION, Daejeon (KR)

(72) Inventors: Hwi Kyeong An, Seoul (KR); Jong Myung Kim, Gyeonggi-do (KR); Seok Sun Yoon, Gyeonggi-do (KR); Jong Ik Lee, Gyeonggi-do (KR); Seung Peel Yim, Seoul (KR)

(73) Assignee: KT&G CORPORATION, Daejeon (KR)

( * ) Notice: Subject to any disclaimer, the term of this patent is extended or adjusted under 35 U.S.C. 154(b) by 1017 days.

(21) Appl. No.: 17/286,527

(22) PCT Filed: Dec. 4, 2020

(86) PCT No.: PCT/KR2020/017618
§ 371 (c)(1),
(2) Date: Apr. 19, 2021

(87) PCT Pub. No.: WO2021/182720
PCT Pub. Date: Sep. 16, 2021

(65) Prior Publication Data

US 2022/0361589 A1 Nov. 17, 2022

(30) Foreign Application Priority Data

Mar. 11, 2020 (KR) ........................ 10-2020-0030386

(51) Int. Cl.
*A24F 40/85* (2020.01)
*A24F 9/06* (2006.01)
(Continued)

(52) U.S. Cl.
CPC .............. *A24F 40/85* (2020.01); *A24F 40/46* (2020.01); *B08B 1/12* (2024.01); *A24F 9/06* (2013.01); *A46B 2200/3013* (2013.01)

(58) Field of Classification Search
CPC ............... A24F 40/85; A24F 9/06; A24F 9/10
See application file for complete search history.

(56) References Cited

U.S. PATENT DOCUMENTS 2,388,016 A * 10/1945 Smith ........................ A24F 9/06 131/245
2,487,676 A 11/1949 Smith
(Continued)

FOREIGN PATENT DOCUMENTS

CN 2155294 Y 2/1994
CN 205086010 U 3/2016
(Continued)

OTHER PUBLICATIONS

Chinese Office Action dated Apr. 28, 2023 in Chinese Application No. 202080007313.3.
(Continued)

*Primary Examiner* — Michael H. Wilson
*Assistant Examiner* — Stephanie Lynn Moore
(74) *Attorney, Agent, or Firm* — Sughrue Mion, PLLC

(57) ABSTRACT

A cleaning kit for an aerosol generating device includes a blade portion formed at one side of the cleaning kit, and configured to separate residual materials adhered to at least one of a heater and an accommodation portion of the aerosol generating device; and a brush portion formed at another side of the cleaning kit, and configured to remove the separated residual materials from the aerosol generating device.

9 Claims, 8 Drawing Sheets

(51) Int. Cl.

| | |
|---|---|
| ***A24F 40/46*** | (2020.01) |
| ***B08B 1/12*** | (2024.01) |

(56) References Cited

U.S. PATENT DOCUMENTS

| | | | | |
|---|---|---|---|---|
| 2014/0262856 | A1* | 9/2014 | Damiani .................. | A24D 1/08 206/86 |
| 2018/0177226 | A1 | 6/2018 | Royse, IV | |
| 2020/0054068 | A1 | 2/2020 | Blandino et al. | |
| 2020/0359681 | A1 | 11/2020 | Han et al. | |
| 2021/0000186 | A1 | 1/2021 | Dayioglu | |
| 2021/0000187 | A1* | 1/2021 | Bernhard ................ | A24F 40/85 |
| 2021/0076748 | A1 | 3/2021 | Chen et al. | |

FOREIGN PATENT DOCUMENTS

| | | | |
|---|---|---|---|
| CN | 106231931 | A | 12/2016 |
| CN | 208192141 | U | 12/2018 |
| CN | 208288505 | U | 12/2018 |
| CN | 209331184 | U | 9/2019 |
| EP | 3 610 744 | A1 | 2/2020 |
| JP | 3215374 | U | 2/2018 |
| JP | 2018-191550 | A | 12/2018 |
| JP | 2019-208445 | A | 12/2019 |
| KR | 20-0490513 | Y1 | 11/2019 |
| RU | 2682351 | C1 | 3/2019 |
| WO | 2015/165709 | A1 | 11/2015 |
| WO | 2019/030166 | A1 | 2/2019 |
| WO | 2019/166595 | A1 | 9/2019 |
| WO | 2019/175099 | A1 | 9/2019 |
| WO | 2019/175104 | A1 | 9/2019 |
| WO | 2019/192371 | A1 | 10/2019 |
| WO | 2020/016274 | A1 | 1/2020 |

OTHER PUBLICATIONS

International Search Report for PCT/KR2020/017618 dated Mar. 15, 2021 (PCT/ISA/210).

Written Opinion for PCT/KR2020/017618 dated Mar. 15, 2021 (PCT/ISA/237).

Office Action dated Jul. 28, 2022 issued by the Canadian Patent Office in Canadian Application No. 3,116,388.

Office Action dated Jul. 4, 2022 issued by the European Patent Office in European Application No. 20 873 381.6.

Office Action dated Jan. 25, 2023 from the Russian Patent Office in Application No. 2021113464/03(028537).

Extended European Search Report dated Jan. 4, 2022, issued by the European Patent Office in application No. 20873381.6.

* cited by examiner

CLEANING KIT FOR AEROSOL GENERATING DEVICE

TECHNICAL FIELD

One or more embodiments relate to a cleaning kit for an aerosol generating device, and more particularly, to a cleaning kit for cleaning an aerosol generating device by moving while contacting an accommodation portion and a heater of the aerosol generating device.

BACKGROUND ART

Recently, the demand for alternatives to traditional cigarettes has increased. For example, there is growing demand for an aerosol generating device that generates aerosols by heating an aerosol generating material, rather than by combusting cigarettes. Accordingly, studies on a heating-type cigarette and a heating-type aerosol-generating device have been actively conducted.

When an aerosol generating article (e.g., a cigarette) is heated to generate an aerosol, residual materials of the aerosol may adhere to an aerosol generating device and may cause damage or failure of the aerosol generating device. In addition, thermal efficiency may be reduced, and an unpleasant odor may be generated while smoking due to incomplete combustion caused by the adhered residual materials.

Thus, users need to individually clean an aerosol generating device. However, it is difficult for a user to cleanly clean residual materials adhered to the aerosol generating device through general cleaning tools.

DISCLOSURE OF INVENTION

Technical Problem

Residual materials adhered to the aerosol generating device may cause damage or failure of the aerosol generating device, and may cause discomfort to the user by changing the flavor of the generated aerosol.

Accordingly, a cleaning kit for efficiently removing the residual materials adhered to the aerosol generating device needs to be provided to the user. For a complete cleaning, the cleaning kit needs to be in close contact with components (for example, a heater) of the aerosol generating device.

The technical problems of the present disclosure are not limited to the above-described technical problems, and other technical problems may be derived from the embodiments to be described hereinafter.

Solution to Problem

One or more embodiments include a cleaning kit for separating residual materials adhered to a heater unit and an accommodation portion of the aerosol generating device and removing the separated residual materials.

According to an aspect of the present disclosure, a cleaning kit for an aerosol generating device includes a blade portion formed at one side of the cleaning kit, and configured to separate residual materials adhered to at least one of a heater and an accommodation portion of the aerosol generating device; and a brush portion formed at another side of the cleaning kit, and configured to remove the separated residual materials from the aerosol generating device.

Advantageous Effects of Invention

In a cleaning kit for an aerosol generating device according to one or more embodiments, residual materials adhered to a heater unit and an accommodation portion of the aerosol generating device may be separated and removed from the aerosol generating device. A blade portion located at one side of the cleaning kit may separate the adhered residual materials while closely contacting the heater unit and the accommodation portion. A brush portion located at the other side of the cleaning kit may remove the residual materials separated by the blade portion from the aerosol generating device.

By using the cleaning kit for an aerosol generating device according to one or more embodiments, a user may clean the aerosol generating device conveniently without using an additional cleaning tool or disassembling the aerosol generating device.

As the residual materials of the aerosol generating device are removed, the risk of damage or failure of the aerosol generating device may be reduced. Also, as the residual materials are removed, generation of unnecessary materials may be prevented when the aerosol generating device is heated, and an aerosol having a high quality flavor may be provided to the user.

BEST MODE FOR CARRYING OUT THE INVENTION

Figure 1:
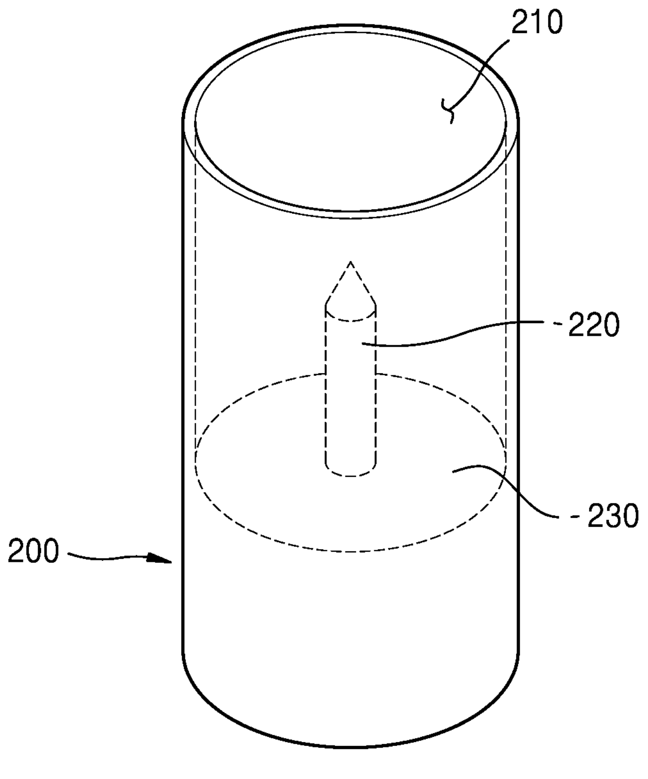
FIG. 1 illustrates an example of an aerosol generating device.

According to an aspect of the present disclosure, a cleaning kit for an aerosol generating device includes a blade portion formed at one side of the cleaning kit, and configured to separate residual materials adhered to at least one of a heater and an accommodation portion of the aerosol generating device; and a brush portion formed at another side of the cleaning kit, and configured to remove the separated residual materials from the aerosol generating device.

The blade portion and the brush portion may be arranged in series along a longitudinal direction of the cleaning kit.

The cleaning kit may further include cover portions configured to cover the blade portion and the brush portion.

A through hole may be formed in the blade portion such that the residual materials separated from the heater and the accommodation portion are discharged through the through hole.

The blade portion may include a first blade portion and a second blade portion which are configured to apply an elastic force that pulls the first blade portion and the second blade portion toward each other.

A hollow may be formed between the first blade portion and the second blade portion, such that the heater is inserted into the hollow when the blade portion is inserted into the accommodation portion.

A diameter of the hollow may be changed according to a diameter of the heater when the heater is inserted into the hollow.

A bottom edge of the blade portion may be configured to contact a bottom surface of the accommodation portion when the blade portion is inserted into the accommodation portion The bottom edge of the blade portion may be curved, and curvature of the bottom edge may be reduced when the blade portion is inserted into the accommodation portion.

The blade portion may be formed as a leaf spring having elasticity.

A side edge of the blade portion may be configured to contact an inner wall of the accommodation portion when the blade portion is inserted into the accommodation portion.

The side edge of the blade portion may extend in parallel with a longitudinal central axis of the blade portion.

MODE FOR THE INVENTION

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

In addition, terms used in the present specification are for describing the embodiments and are not intended to limit the embodiments. In the present specification, the singular form also includes the plurality form unless specifically stated in the phrase.

Throughout the specification, the "longitudinal direction" of a component may be a direction in which the component extends along an axis in one direction of the component, wherein the axis in one direction of the component extends longer than an axis in the other direction of the component crossing the axis in one direction of the component.

As used herein, expressions such as "at least one of," when preceding a list of elements, modify the entire list of elements and do not modify the individual elements of the list. For example, the expression, "at least one of a, b, and c." should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Since various embodiments described in the specification are classified arbitrarily only for the purpose of explaining inventions, the embodiments should not be construed to be exclusive to each other. For example, some features disclosed in one embodiments may be applied to or implemented in other embodiments. Also, it is possible to change some features for applying or implement those features in other embodiments within scope and spirit of this disclosure.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

FIG. 1 illustrates an example of an aerosol generating device 200.

The aerosol generating device 200 is a subject to be cleaned with a cleaning kit (see 100 of FIG. 2A) according to an embodiment. The aerosol generating device 200 may include an accommodation portion 210 and a heater 220.

The accommodation portion 210 of the aerosol generating device 200 may accommodate a cigarette. The cigarette may be accommodated in the accommodation portion 210 of the aerosol generating device 200, used, and then removed by a user. When the cigarette is heated or removed, residual materials of the cigarette may adhere to the accommodation portion 210 (e.g., side wall of the cavity for accommodating a cigarette), a bottom surface 230 of the accommodation portion 210, and the heater 220 of the aerosol generating device 200. The residual materials generated from the cigarette may cause damage or failure of the aerosol generating device 200. Also, when the residual materials are heated, the flavor of an aerosol may be deteriorated.

The aerosol generating device 200 may include the heater 220. The heater 220 of the aerosol generating device 200 may be an electro-resistive heater 220. The heater 220 may include an electrically conductive track, and the heater 220 may be heated when electrical current flows through the electrically conductive track. In the aerosol generating device 200 of FIG. 1, the heater 220 may be of a needle type. However, the shape of the heater 220 is not limited thereto, and the heater 220 may be of an external heating type and may have a shape surrounding the cigarette.

Components relating to the cleaning kit 100 for an aerosol generating device according to an embodiment are shown in the aerosol generating device 200 shown in FIG. 1. Thus, it will be understood by those skilled in the art relating to embodiments that other general components than the components shown in FIG. 1 may be further included in the aerosol generating device 200.

The components of the aerosol generating device 200 shown in FIG. 1 may be referred to below to describe the cleaning kit 100 for an aerosol generating device according to an embodiment in more detail.

Figure 2A:
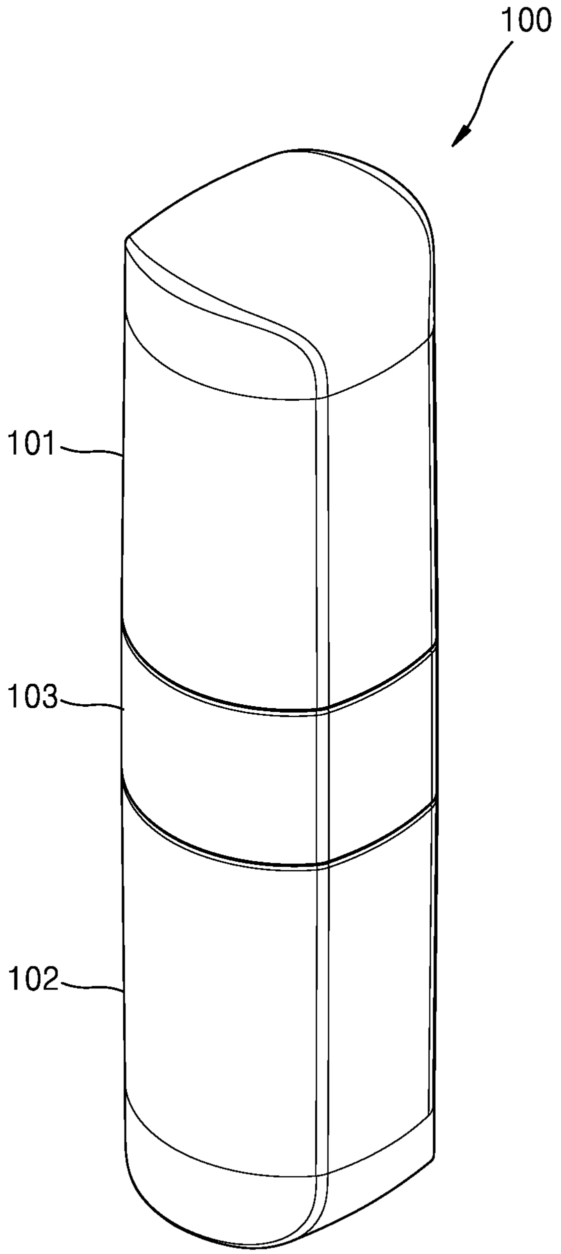
FIG. 2A is a perspective view of a cleaning kit for an aerosol generating device according to an embodiment.
Figure 2B:
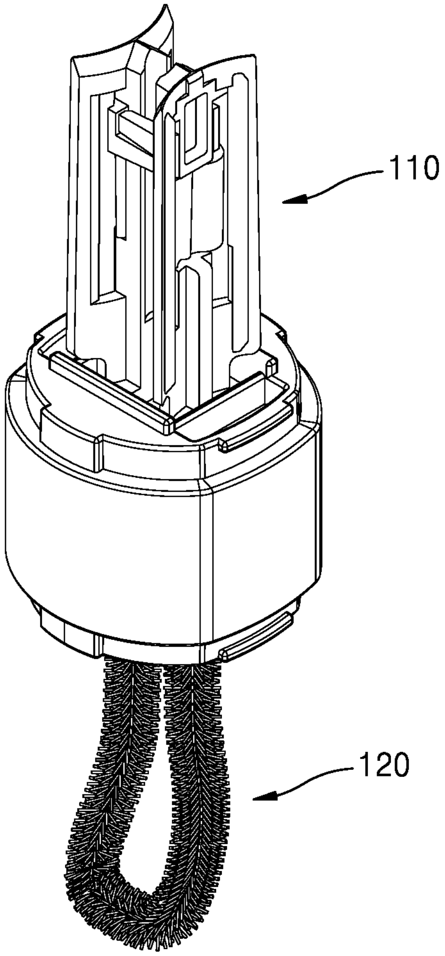
FIG. 2B is a perspective view of a cleaning kit for an aerosol generating device shown in FIG. 2A with cover portions removed.

FIG. 2A is a perspective view of a cleaning kit 100 with a cover portions 101 and 102 coupled to a body portion 103, according to an embodiment, and FIG. 2B is a perspective view of a cleaning kit 100 without the cover portions 101 and 102.

Referring to FIG. 2A, the external shape of the cleaning kit 100 for an aerosol generating device according to an embodiment is shown. The cleaning kit 100 for an aerosol generating device according to an embodiment may include cover portions 101 and 102 and a body portion 103. The cover portions 101 and 102 may include a first cover portion 101 and a second cover portion 102.

The first cover portion 101 and the second cover portion 102 may protect different components of the cleaning kit 100 for an aerosol generating device. The first cover portion 101 and the second cover portion 102 may be arranged in series along a longitudinal direction of the cleaning kit 100 and may be coupled to the cleaning kit 100.

The cover portions 101 and 102 may be coupled to the body portion 103 of the cleaning kit 100 by interference fit or magnetism, for example. In a case where the cover portions 101 and 102 are coupled to the body portion 103 of the cleaning kit 100 by interference fit, a hook portion (not shown) may be formed on the cover portions 101 and 102, and an accommodation groove (not shown) for accommodating the hook portion may be formed on the body portion 103 of the cleaning kit 100. The hook portion formed on the cover portions 101 and 102 may be inserted into the accommodation groove so that the cover portions 101 and 102 may be coupled to the body portion 103 of the cleaning kit 100.

In a case where the cover portions 101 and 102 are coupled to the body portion 103 of the cleaning kit 100 by magnetism, magnets may be arranged in each of the cover portions 101 and 102 and the body portion 103 of the cleaning kit 100. When the cover portions 101 and 102 are adjacent to the body portion 103 of the cleaning kit 100, the magnets arranged on the cover portions 101 and 102 and the body portion 103 may attract each other. Thus, the cover portions 101 and 102 and the body portion 103 may be coupled to each other.

At least part of the cover portions 101 and 102 may be separated from the body portion 103 when the cleaning kit 100 is used. That is, while part of the cover portions 101 and 102 is connected to the body portion 103 or the cover portions 101 and 102 are fully separated from the body portion 103, the cleaning kit 100 may be used by the user.

Internal components of the cleaning kit 100 for an aerosol generating device according to an embodiment will be described in detail with reference to FIG. 2B. FIG. 2B is a perspective view of the cleaning kit 100 shown in FIG. 2A with the cover portions 101 and 102 removed.

The cleaning kit 100 for an aerosol generating device according to an embodiment may include a blade portion 110 located at one side of the body portion 103 and a brush portion 120 connected to the opposite side of the body portion 103.

The blade portion 110 may separate residual materials from the accommodation portion 210, a bottom surface 230 of the accommodation portion 210, and the heater 220 of the aerosol generating device 200. The blade portion 110 may be inserted into the accommodation portion 210 of the aerosol generating device 200 and may apply force to components in the accommodation portion 210.

When the blade portion 110 is inserted into the accommodation portion 210, the blade portion 110 may be in close contact with each of the accommodation portion 210, the bottom surface 230 of the accommodation portion 210, and the heater 220. The blade portion 110 may be inserted into the accommodation portion 210 and rotated about a longitudinal axis of the accommodation portion 210. As the blade portion 110 is rotated, the residual materials may be separated from the accommodation portion 210, the bottom surface of the accommodation portion 210, and the heater 220.

The brush portion 120 located at the other side of the body portion 103 may remove the separated residual materials from the aerosol generating device 200. The brush portion 120 may include a plurality of fine hairs. The plurality of fine hairs may collect the residual materials adhered to the accommodation portion 210 of the aerosol generating device 200, the bottom surface 230 of the accommodation portion 210, and the heater 220, so that the residual materials may be removed.

The user may use the blade portion 110 and the brush portion 120 to clean the aerosol generating device 200. For example, the user may insert the blade portion 110 into the accommodation portion 210 of the aerosol generating device 200, thereby detaching the adhered residual materials from the accommodation portion 210, the bottom surface 230 of the accommodation portion 210, and the heater 220.

Subsequently, the user may insert the brush portion 120, thereby removing the detached residual materials from the accommodation portion 210 of the aerosol generating device 200, the bottom surface 230 of the accommodation portion 210, and the heater 220. As the blade portion 110 and the brush portion 120 are integrally formed, the user may clean the aerosol generating device 200 more conveniently.

Figure 3A:
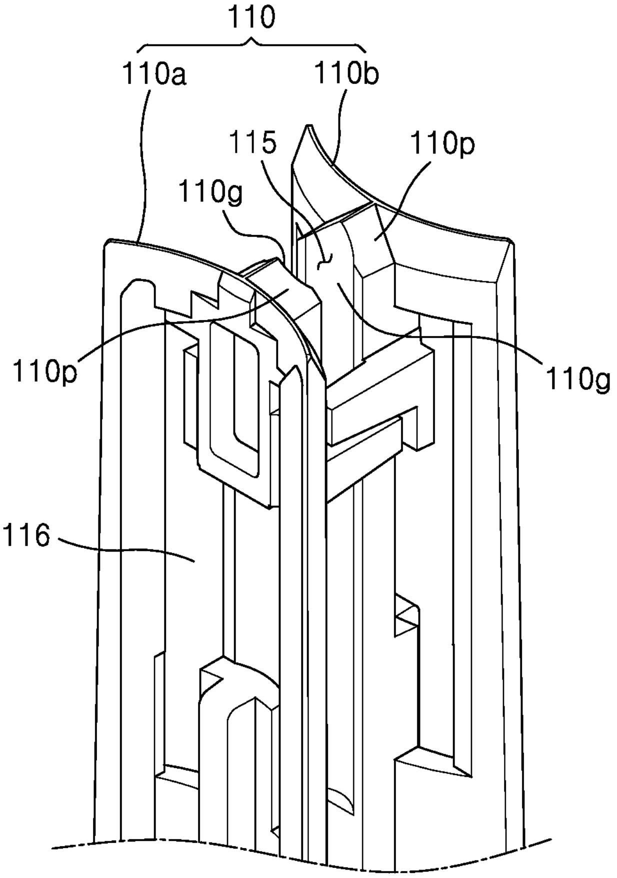
FIG. 3A is a perspective view of a cleaning kit for an aerosol generating device according to an embodiment.

FIG. 3A is a perspective view of a blade portion 110 of a cleaning kit 100 for an aerosol generating device according to an embodiment. A through hole 116 may be formed in the blade portion 110. Residual materials separated from a heater 220 and an accommodation portion 210 may be collected from the aerosol generating device through the through hole 116.

For example, the blade portion 110 may be rotated about a longitudinal axis of the accommodation portion 210 while being inserted into the accommodation portion 210. Thus, the residual materials may be separated from the accommodation portion 210, a bottom surface 230 of the accommodation portion 210, and the heater 220. When the residual materials are separated, the through hole 116 formed in the blade portion 110 may be a path through which the residual materials pass.

The blade portion 110 may include a first blade portion 110*a* and a second blade portion 110*b*, which may apply an elastic force to each other. The blade portion 110 may be symmetrical. The first blade portion 110*a* and the second blade portion 110*b* may be apart from each other by a certain distance. A hollow 115 into which the heater 220 is inserted may be formed between the first blade portion 110*a* and the second blade portion 110*b*. The first blade portion 110*a* and a second blade portion 110*b* may respectively include protrusion 110*p*. The protrusion 110*p* may protrude toward the hollow 115 and form a part of the hollow 115. The first blade portion 110*a* and a second blade portion 110*b* may respectively include groove 110*g*. The groove 110 may form a part of the hollow 115.

The first blade portion 110*a* and the second blade portion 110*b* may apply an elastic force to each other. In other words, the elastic force may act in a direction in which the first blade portion 110*a* and the second blade portion 110*b* are pulled toward each other. When external force larger than the elastic force is applied to spread the first blade portion 110*a* and the second blade portion 110*b*, a separation distance between the first blade portion 110*a* and the second blade portion 110*b* may increase.

Figure 3B:
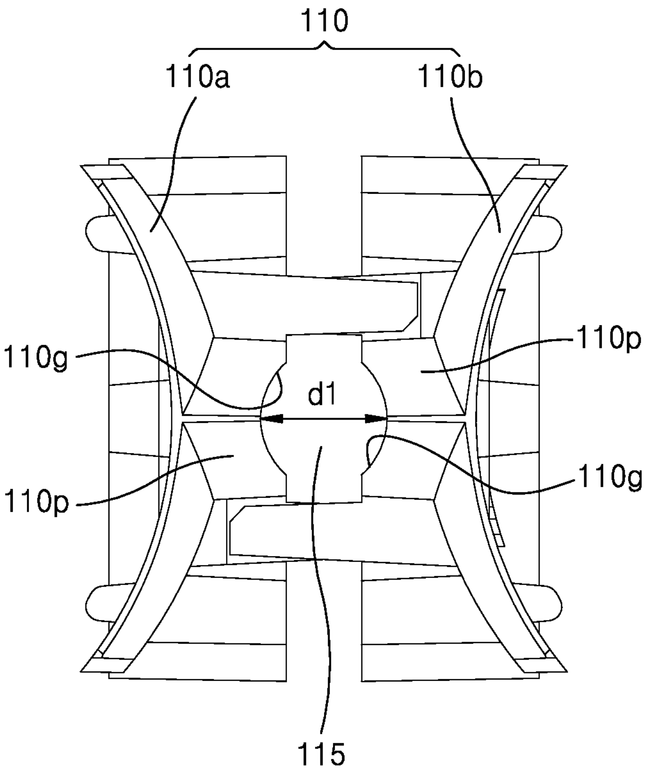
FIGS. 3B-3C are plan views of a blade portion shown in FIG. 3A.
Figure 3C:
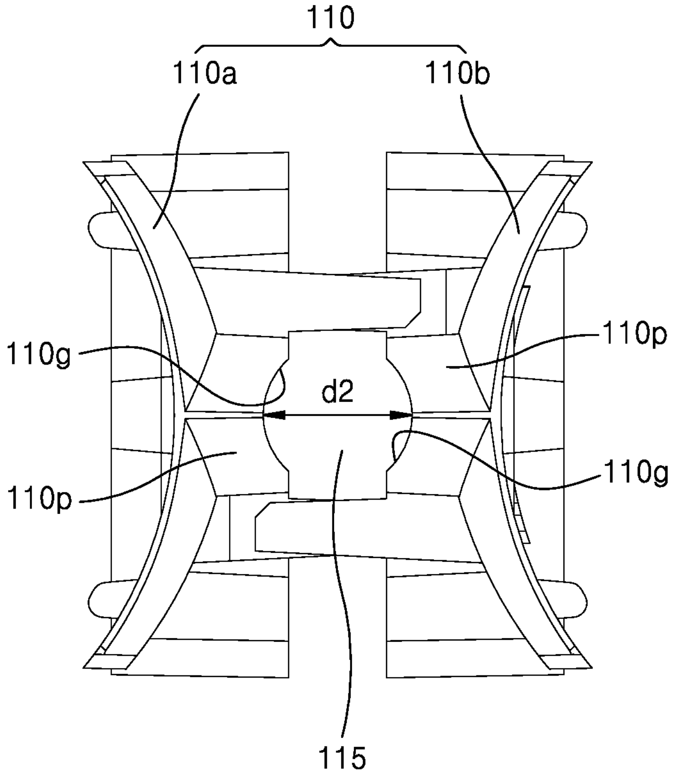

FIG. 3B is a plan view of the blade portion 110 shown in FIG. 3A according to an aspect, and FIG. 3C is a plan view of the blade portion 110 shown in FIG. 3A according to another aspect. Referring to FIGS. 3B and 3C, the appearance of one aspect and another aspect of the blade portion 110 may be shown in more detail.

FIG. 3B is a plan view when no external force is applied to the first blade portion 110*a* and the second blade portion 110*b*. For example, when the blade portion 110 is not used, a diameter of the hollow 115 between the first blade portion 110*a* and the second blade portion 110*b* may be d1.

FIG. 3C is a plan view when an external force is applied to the first blade portion 110*a* and the second blade portion 110*b*. For example, when the blade portion 110 is used, the heater 220 may be inserted into the hollow 115 between the first blade portion 110*a* and the second blade portion 110*b*. The diameter of the heater 220 may be greater than the diameter of the hollow 115. Therefore, as the heater unit 220 is inserted into the hollow 115, the diameter of the hollow 115 may be changed to correspond to the dimeter of the heater 220.

Comparing FIG. 3B with FIG. 3C, as the heater 220 is inserted into the hollow 115, the diameter of the hollow 115 between the first blade portion 110*a* and the second blade portion 110*b* may be changed from d1 to d2. At this time, d2 may be greater than d1.

A spring may be arranged between the first blade portion 110*a* and the second blade portion 110*b*. When the distance between the first blade portion 110*a* and the second blade portion 110*b* increases, the spring may apply an elastic force in a direction in which the first blade portion 110*a* and the second blade portion 110*b* are pulled toward each other.

As the separation distance between the first blade portion 110*a* and the second blade portion 110*b* increases (for example, as the diameter of the hollow 115 is changed from d1 to d2), the elastic force between the first blade portion 110*a* and the second blade portion 110*b* may increase. Thus, an inner surface of the first blade portion 110*a* and an inner surface of the second blade portion 110*b*, which form the hollow 115, may be in close contact with the inserted heater 220.

Figure 4:
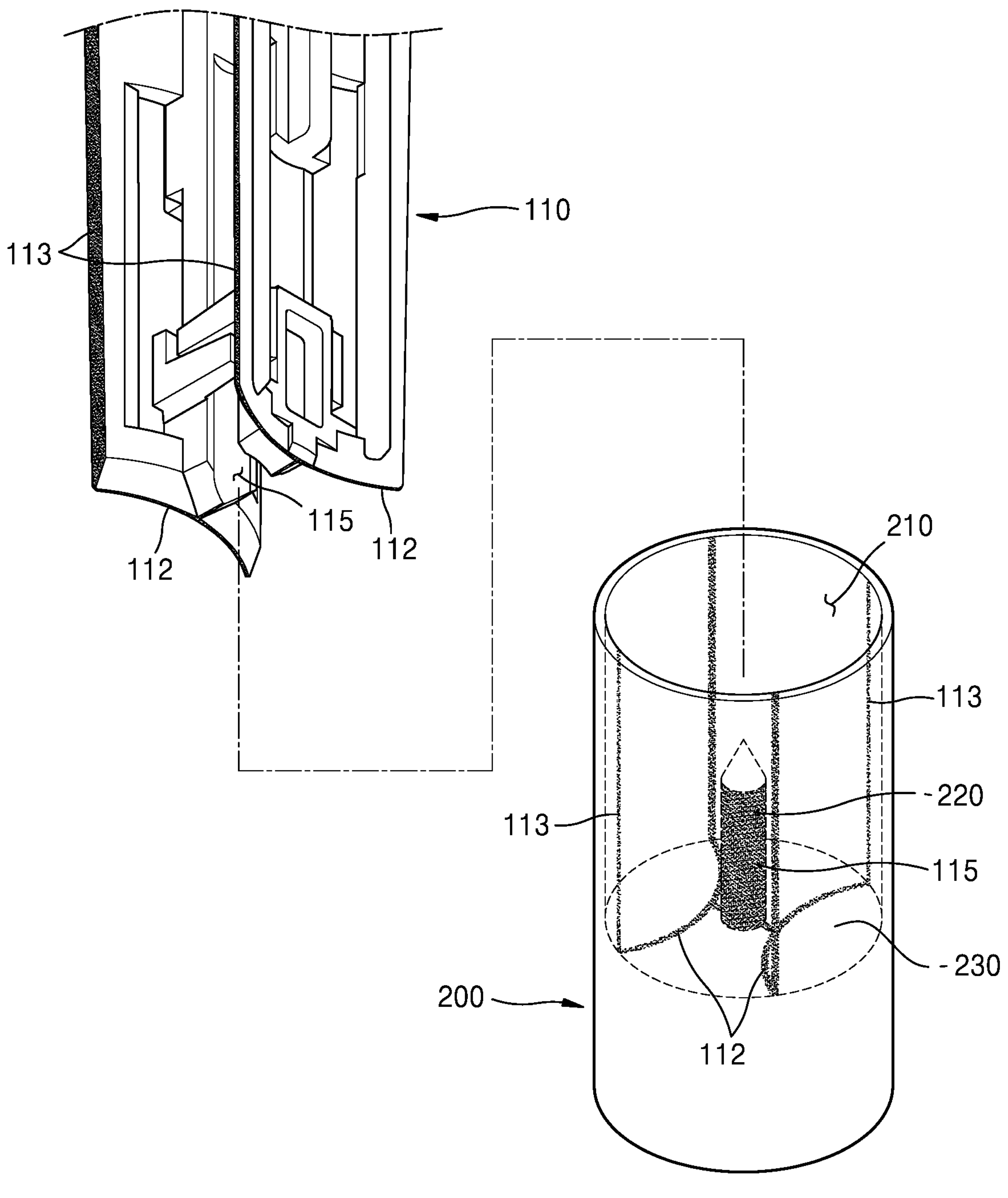
FIGS. 4 and 5 are views schematically illustrating the blade portion of FIG. 3A inserted into the aerosol generating device.
Figure 5:
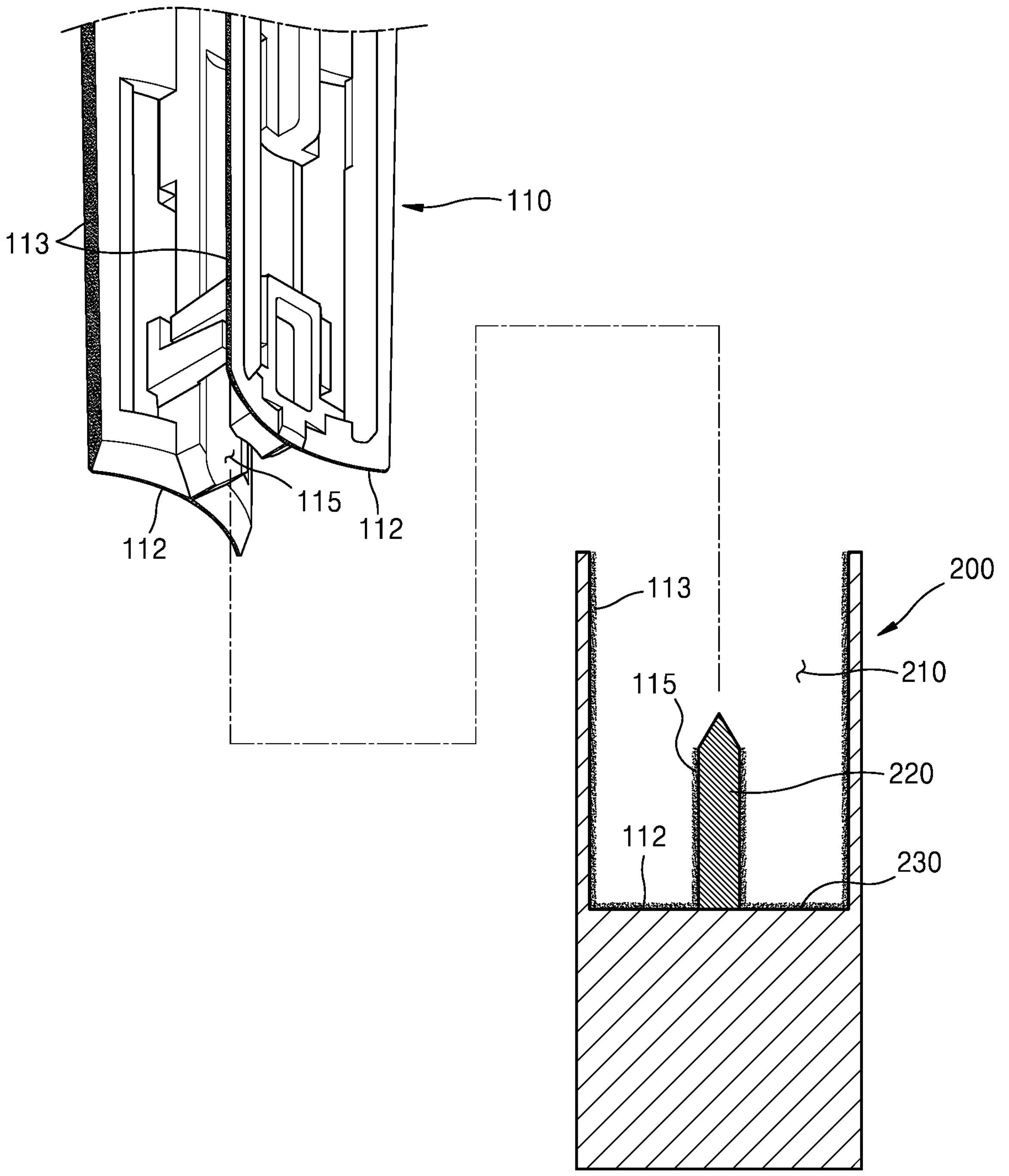

FIGS. 4 and 5 are views schematically illustrating corresponding components when the blade portion 110 shown in FIG. 3A is inserted into the aerosol generating device 200.

FIGS. 4 and 5 show how the aerosol generating device 200 contact the blade portion 110 when the blade portion 110 is inserted into the aerosol generating device 200.

When the blade portion 110 is inserted into the aerosol generating device 200, the blade portion 110 may come in contact with corresponding portions of the aerosol generating device 200.

When the blade portion 110 is inserted into the accommodation portion 210 of the aerosol generating device 200, the heater 220 may be inserted into the hollow 115 of the blade portion 110.

As described above with reference to FIGS. 3B and 3C, when the heater 220 is inserted into the hollow 115 of the blade portion 110, the diameter of the hollow 115 may be changed to correspond to the size of the heater 220. By elastic force between the first blade portion 110*a* and the second blade portion 110*b*, the blade portion 110 and the heater 220 may contact each other closely.

Also, when the blade portion 110 is inserted into the accommodation portion 210 of the aerosol generating device 200, an end 112 of the blade portion 110 may contact the bottom surface 230 of the accommodation portion 210 of the aerosol generating device 200. Contact between an end 112 of the blade portion 110 and the bottom portion 230 of the accommodation portion 210 may be secured by the user's external force.

In an embodiment where the blade portion 110 may include the first blade portion 110*a* and the second blade portion 110*b* as described in FIGS. 3B and 3C, the bottom edges of the first blade portion 110*a* and the second blade portion 110*b* may the bottom surface 230 of the accommodation portion 210. The separation distance between the bottom edges 112 may be changed according to changes in the separation distance between the first blade portion 110*a* and the second blade portion 110*b*.

For example, as the blade portion 110 is inserted into the accommodation portion 210 and the separation distance between the first blade portion 110*a* and the second blade portion 110*b* increases from d1 to d2, a distance between the bottom edges 112 may increase by a difference between d1 and d2. Also, as the blade portion 110 is withdrawn from the accommodation portion 210 and the separation distance between the first blade portion 110*a* and the second blade portion 110*b* decreases from d2 to d1, the distance between the bottom edges 112 may decrease by a difference between d1 and d2.

Also, when the blade portion 110 is inserted into the accommodation portion 210 of the aerosol generating device 200, side edges 113 of the blade portion 110 may be in contact with an inner wall of the accommodation portion 210. The inner wall of the accommodation portion 210 may form a cavity for accommodating a cigarette and may be arranged to surround the heater 220. The side edges 113 of the blade portion 110 may be an edge farthest from the longitudinal central axis of the blade portion 110 in a radial direction.

The blade portion 110 may include four side edges 113, for example. In an embodiment where the blade portion 110 includes the first blade portion 110*a* and the second blade portion 110*b*, two side edges 113 may be formed on each of the first blade portion 110*a* and the second blade portion 110*b*. The side edges 113 may be formed to extend in parallel with the longitudinal central axis of the blade portion 110.

The blade portion 110 may be a leaf spring and may have certain elasticity. As shown in FIG. 4, the bottom edge 112 of the blade portion 110 may be curved convexly toward the longitudinal central axis of the blade portion 110. When the blade portion 110 is inserted, the blade portion 110 may be deformed by contact with the accommodation portion 210 such that the curvature of the blade portion 110 is reduced. In another example, pressure may be applied to the blade portion 110 in a direction perpendicular to the longitudinal central axis of the blade portion 110 such that the radius of curvature of the blade portion 110 may be reduced.

FIG. 5 illustrates components of the aerosol generating device 200 which contact the blade portion 110, according to an embodiment.

When the blade portion 110 is inserted into the accommodation portion 210, the hollow 115 of the blade portion 110 may be in contact with the heater 220, and the bottom edges 112 of the blade portion 110 may be in contact with the bottom surface 230 of the accommodation portion 210, and the side edges 113 of the blade portion 110 may be in contact with the inner wall of the accommodation portion 210.

That is, the blade portion 110 may come into close contact with the heater 220, the bottom surface 230 of the accommodation portion 210, and the inner wall of the accommodation portion 210, and may be rotated while maintaining the contact. As the blade portion 110 is inserted into the accommodation portion 210, the longitudinal central axis of the hollow 115 of the blade portion 110 and the longitudinal central axis of the beater 220 may coincide with each other, and the blade portion 110 may be rotated about the longitudinal central axis of the heater 220.

When the blade portion 110 is rotated, a frictional force may act between the blade portion 110 and the components positioned in the accommodation portion 210 (i.e., the bottom surface 230 of the accommodation portion 210, the inner wall of the accommodation portion 210, and the heater 220). Thus, the residual materials may be separated from the bottom surface 230 of the accommodation portion 210, the inner wall of the accommodation portion 210, and the heater 220.

The cleaning kit 100 for an aerosol generating device according to the above-described embodiments may separate the residual materials adhered to the heater 220 and the accommodation portion 210 of the aerosol generating device 200, and may remove the separated residual materials from the aerosol generating device 200. The blade portion 110 formed at one side of the cleaning kit 100 may be in contact with the heater 220 and the accommodation portion 210 to separate the adhered residual materials, and the brush portion 120 formed at the other side of the cleaning kit 100 may remove the residual materials separated by the blade portion 110 from the aerosol generating device 200.

Through the cleaning kit 100 for an aerosol generating device according to embodiments, the user may clean the aerosol generating device 200 conveniently without using an additional cleaning tool or disassembling the aerosol generating device 200.

As the residual materials of the aerosol generating device 200 are removed, the risk of damage or failure of the aerosol generating device 200 may be reduced, and unnecessary materials may be prevented from generating when the aerosol generating device is heated. Thus, an aerosol having a high quality flavor may be provided to the user, and the user's satisfaction may be improved.

Those of ordinary skill in the technical field related to the present embodiments will understand that the present disclosure may be implemented in a modified form without departing from the essential characteristics of the above-described description. The disclosed methods should be considered in a descriptive sense only and not for purposes of limitation. The scope of the present disclosure is shown in the claims rather than the foregoing description, and all differences within the scope equivalent thereto should be interpreted as being included in the present disclosure.

INDUSTRIAL APPLICABILITY

One or embodiments relate to a cleaning kit for an aerosol generating device that may clean the aerosol generating device while contacting an accommodation portion and a heater of the aerosol generating device.

The invention claimed is:

1. A cleaning kit for an aerosol generating device, the cleaning kit comprising:
   a blade portion formed at one side of the cleaning kit, and configured to separate residual materials adhered to at least one of a heater and an accommodation portion of the aerosol generating device,
   wherein the blade portion comprises a first blade portion and a second blade portion which are configured to apply an elastic force toward each other,
   a hollow is formed between the first blade portion and the second blade portion such that the heater is inserted into the hollow,
   the first blade portion and the second blade portion are respectively curved convexly toward the hollow,
   a diameter of the hollow is changed according to a diameter of the heater when the heater is inserted into the hollow,
   a bottom edge of the blade portion is configured to contact a bottom surface of the accommodation portion when the blade portion is inserted into the accommodation portion, and
   the bottom edge of the blade portion is curved, and curvature of the bottom edge is reduced when the blade portion is inserted into the accommodation portion.

2. The cleaning kit of claim 1, further comprising a brush portion formed at another side of the cleaning kit and connected to the blade portion,
   wherein the brush portion is configured to remove the separated residual materials from the aerosol generating device, and
   the blade portion and the brush portion are arranged in series along a longitudinal direction of the cleaning kit.

3. The cleaning kit of claim 2, further comprising cover portions configured to cover the blade portion and the brush portion.

4. The cleaning kit of claim 1, wherein a through hole is formed in the blade portion such that the residual materials separated from the heater and the accommodation portion are discharged through the through hole.

5. The cleaning kit of claim 1, wherein the first blade portion and the second blade portion respectively comprise a protrusion protruding toward the hollow and forming a part of the hollow.

6. The cleaning kit of claim 5, wherein the protrusion comprises a groove forming a part of the hollow.

7. The cleaning kit of claim 1, wherein the blade portion is formed as a leaf spring having elasticity.

8. The cleaning kit of claim 1, wherein a side edge of the blade portion is configured to contact an inner wall of the accommodation portion when the blade portion is inserted into the accommodation portion.

9. The cleaning kit of claim 8, wherein the side edge of the blade portion extends in parallel with a longitudinal central axis of the blade portion.

* * * * *